United States Patent [19]

Marrison et al.

[11] Patent Number: 5,226,682
[45] Date of Patent: Jul. 13, 1993

[54] COUPLING ASSEMBLY

[75] Inventors: William C. Marrison; Edward C. Lewis, both of Jackson, Mich.; Christopher E. Schadewald, Van Wert; David S. Densel, Convoy, both of Ohio

[73] Assignee: Aeroquip Corporation, Maumee, Ohio

[21] Appl. No.: 918,640

[22] Filed: Jul. 21, 1992

[51] Int. Cl.⁵ .......................................... F16L 37/088
[52] U.S. Cl. .................................. 285/308; 285/321; 285/351; 285/92
[58] Field of Search ............... 285/308, 321, 315, 351, 285/321, 92

[56] References Cited

U.S. PATENT DOCUMENTS

| | | | |
|---|---|---|---|
| 2,479,960 | 8/1949 | Osborn | 285/308 X |
| 3,398,977 | 8/1968 | Yoneda | 285/321 X |
| 3,773,360 | 11/1973 | Timbers | 285/321 X |
| 3,887,222 | 6/1975 | Hammond | 285/321 X |
| 4,105,226 | 8/1978 | Frey et al. | 285/321 X |
| 5,022,687 | 6/1991 | Ariga | 284/321 |
| 5,076,541 | 12/1991 | Daghe et al. | 251/309 |

FOREIGN PATENT DOCUMENTS 659848  1/1964  Italy ................................. 285/321

OTHER PUBLICATIONS

Aeroquip Aerospace Engineering Bulletin, No. AEB 65, Aeroquip Corporation, 1964.
Aeroquip Aerospace Engineering Bulletin, No. AEB 40, Aeroquip Corporation, 1970.

*Primary Examiner*—Dave W. Arola
*Attorney, Agent, or Firm*—Emch, Schaffer, Schaub & Porcello Co.

[57] ABSTRACT

A coupling assembly for connecting two members that includes an annular locking ring. The assembly further includes a first member and a second member. The first member has an exterior surface having a groove for receiving the locking means. The second member has an inner surface having a cavity for receiving the locking means. The first and second members are secured together when the locking ring is engaged in the groove and the cavity.

16 Claims, 7 Drawing Sheets

5,226,682

COUPLING ASSEMBLY

BACKGROUND

The present invention is directed to a coupling assembly for connecting two members together. More specifically, the invention is directed to a coupling assembly for two pipes that includes a locking ring for connecting the pipes. The pipes can be connected in a permanent or detachable relationship.

There is a need for a relatively inexpensive coupling assembly for pipes. The present invention provides such an assembly.

SUMMARY OF INVENTION

The present invention is directed to a coupling assembly for connecting two members. The assembly includes an annular locking ring. The assembly further includes a first member and a second member. The first member has an exterior surface having a groove for receiving the locking means. The second member has an inner surface having a cavity for receiving the locking means. The first and second members are secured together when the locking ring is engaged in the groove and the cavity.

DETAILED DESCRIPTION OF THE PREFERRED EMBODIMENTS

Figure 1:
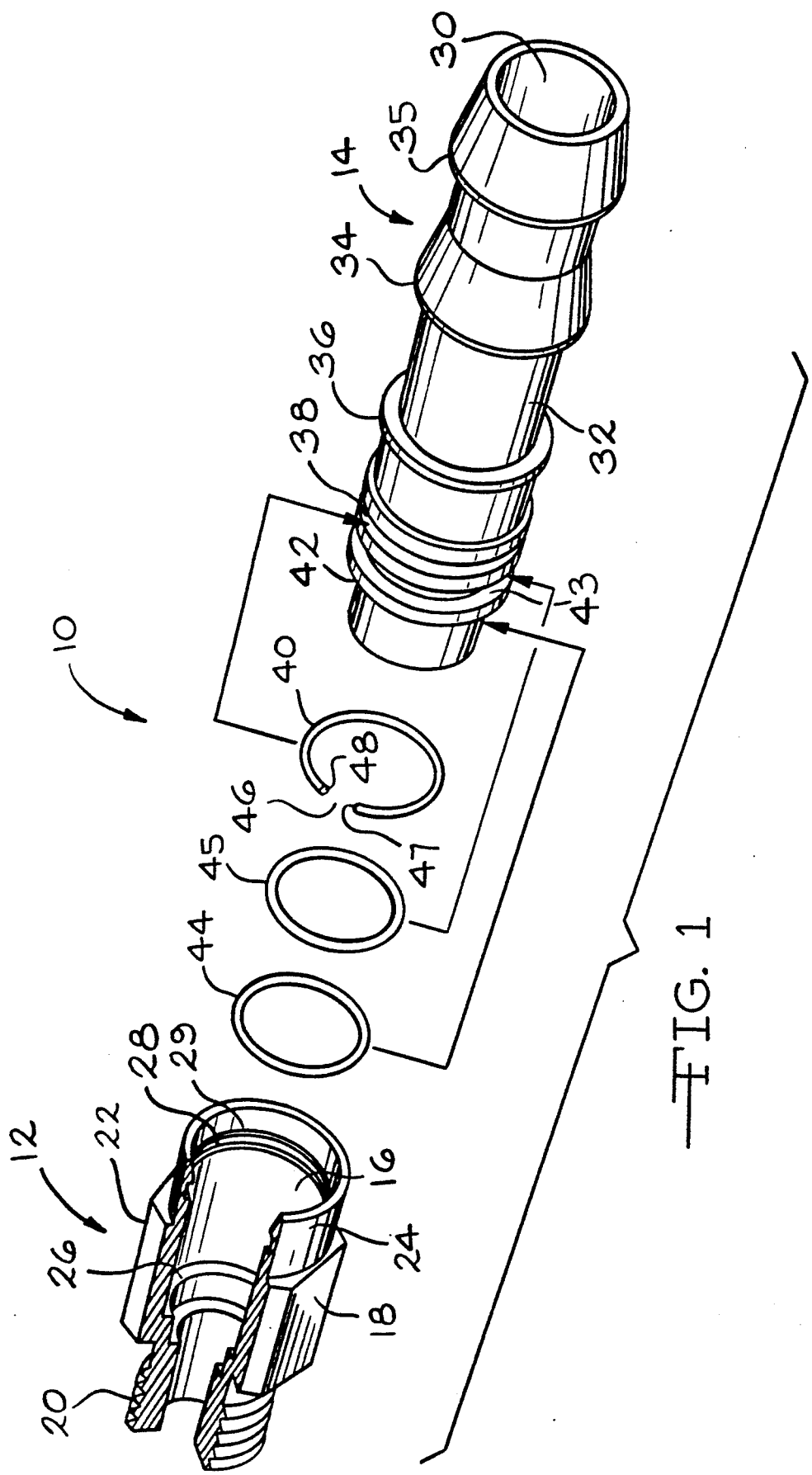
FIG. 1 is an exploded perspective view of a first embodiment of the present invention wherein a portion of the female pipe member is partially cut-away to show the interior of such member.

Referring now to the drawings, the preferred embodiments of the present invention shall be described in detail. The first embodiment is shown in FIGS. 1-6. Referring to FIG. 1, the coupling assembly 10, according to the invention, includes a female pipe member 12 and a male pipe member 14. The pipe members have a tubular shape. The female member 12 has an inner surface 16 and an outer surface 18. The female member 12 on its outer surface 18 includes an externally threaded end portion 20 adapted to be connected to a manifold or piping of a piece of equipment and a polygonal portion 22 that is engaged by a tool for turning the member 12. The female member 12 further includes a male member receiving portion 24. The female member 12 on its inner surface 16 includes at least one shoulder stop 26 and an annular locking ring receiving cavity 28. As shown in FIGS. 2-6, a chamfer 29 is positioned adjacent to the cavity 28.

The male pipe member 14 has an interior surface 30 and an exterior surface 32. The male member 14 includes hose nipples 34 and 35 and a raised hose stop 36 on the exterior surface 32. The male member 14 further includes an annular groove 38 for receiving a locking ring 40. As shown in FIGS. 2-6, a groove chamfer 39 is positioned adjacent to the annular groove 38. At least one O-ring seal groove may be defined on the exterior surface 32 for receiving an O-ring seal. In the present embodiment, two O-ring grooves 42 and 43 are defined to receive two O-ring seals 44 and 45, respectively. The O-ring seals may be made of a variety of elastomeric materials as is well known in the art.

The female pipe member 12 and the male pipe member 14 can be made of a variety of materials. It has been found that metal and plastic materials are preferred.

Still referring to FIG. 1, the locking ring 40 is preferably made of a phosphorus-bronze material. The material is spring tempered so that the ring has flexibility under pressure while maintaining its original shape. In the present embodiment, the ring 40 includes a space 46 between ends 47 and 48 that allows the ring to expand and contract without altering the annular shape of the ring.

Figure 2:
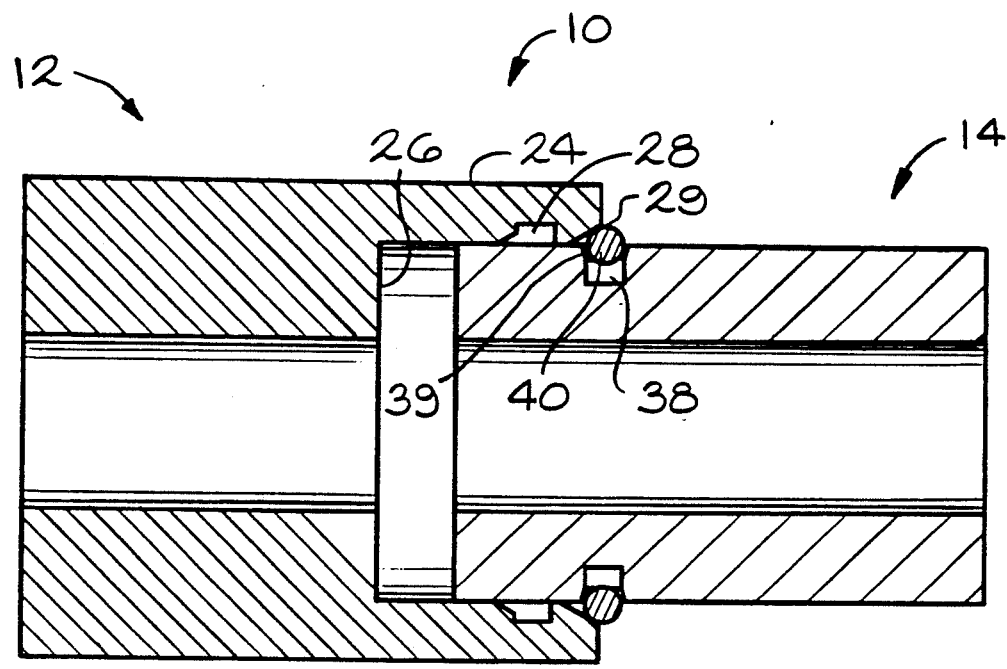
FIG. 2 is a simplified cross-sectional view of the first embodiment of the present invention showing the male pipe member being inserted in the female pipe member and the position of the locking ring.
Figure 3:
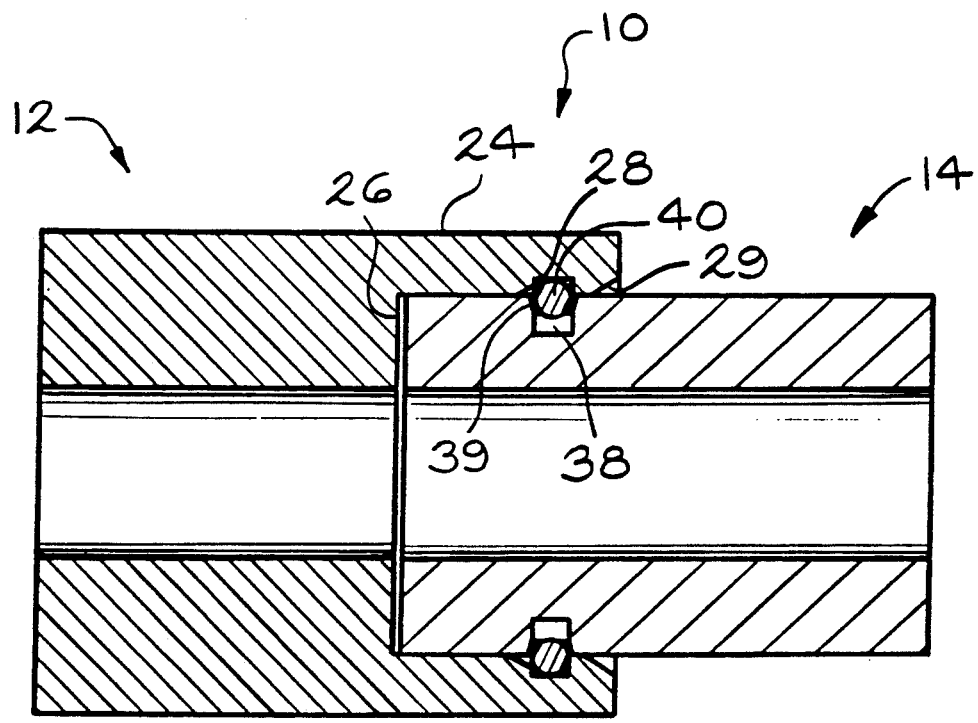
FIG. 3 is a cross-sectional view similar to the view of FIG. 2 showing the male pipe member fully inserted in the female pipe member and the position of the locking ring.

As shown in FIG. 2, the locking ring 40 is placed adjacent to the annular groove 38 of the male member 14 prior to the complete insertion of the male member 14 into the male member receiving portion 24 of the female member 12. As shown in FIG. 3, when the male member 14 is inserted in the female member 12, the ring 40 travels along the chamfer 29 of the female member 12. This causes the ring 40 to contract into the annular groove 38. When the ring 40 travels to the end of the chamfer 29, the spring tempered ring 40 expands into the ring receiving cavity 28 of the female member 12. In the present embodiment, approximately one-half of the ring 40 is positioned in the annular groove 38 and the other one-half of the ring is positioned in the cavity 28. The ring 40 is maintained in position by the resultant force of the angles located on the surfaces forming the cavity 28 and the grove 38, including the groove chamfer 39. The present invention allows the female member 12 and the male member 14 to become attached without the use of a special tool. The positioning of the ring 40 permanently holds the male member 14 and the female member 12 to each other. The shoulder stop 26 restricts the forward movement of the male member 14.

The locking ring 40 also acts as a bearing. When the two members are being forced apart from internal pressure, the male member 14 rides on the ring 40 as it rotates.

Figure 4:
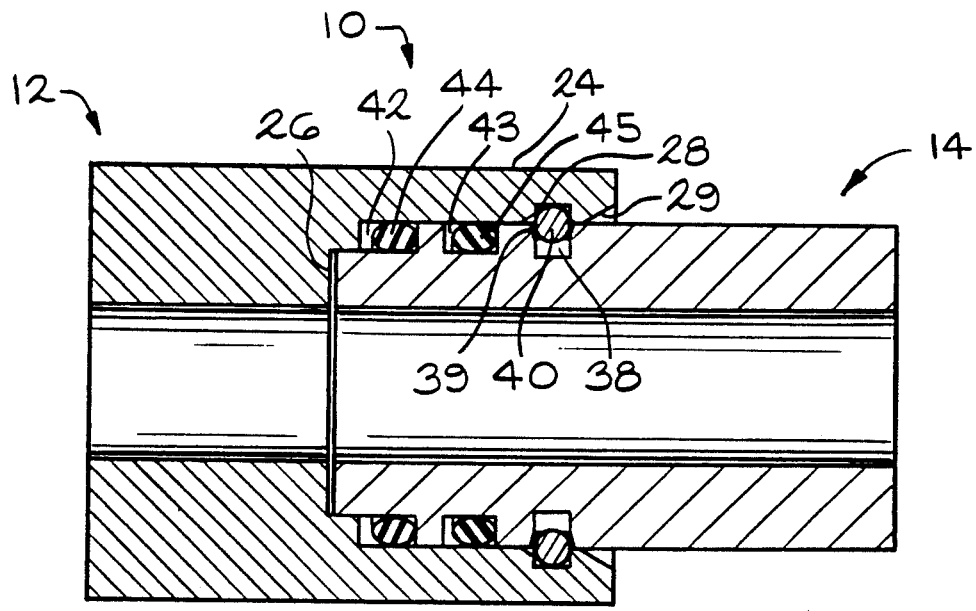
FIG. 4 is a cross-sectional view similar to the view of FIG. 3 showing additional grooves in the male pipe member for O-ring seals and the position of such seals in the grooves.

As shown in FIG. 4, the male member 14 includes O-ring seal grooves 42 and 43 that receive O-ring seals 44 and 45, respectively. The inner surface of the female member 12 cooperates with the grooves 42 and 43 to form chambers for housing the O-ring seals. The seals prevent fluid passing through the members from reaching the exterior of the assembly 10.

Figure 5:
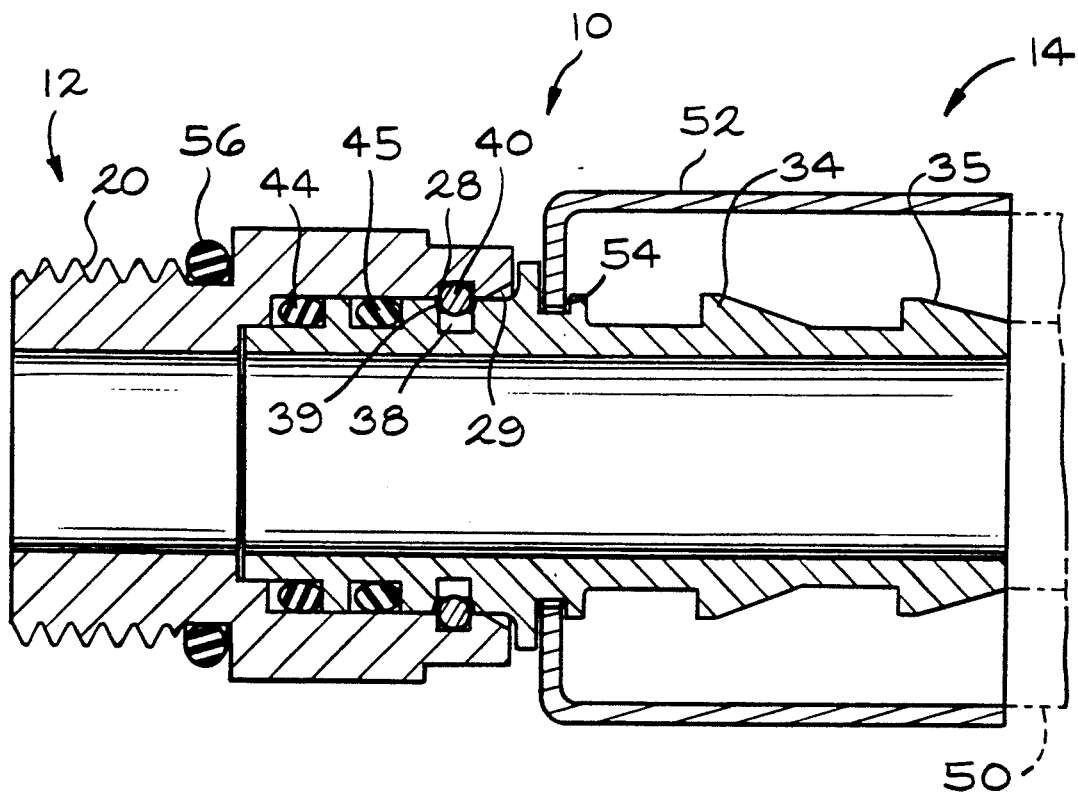
FIG. 5 is a cross-sectional view of the first embodiment of the present invention showing a hose positioned on the male pipe member and a socket for attaching such hose to the member.

Referring to FIG. 5, the first embodiment assembly 10 may include a hose 50 positioned on the male member 14. The hose 50 is retained on the member by hose nipples 34 and 35 and a socket 52 that is crimped at end 54 over the hose 50. In addition to the two O-ring seals 42 and 43, an additional O-ring seal 56 may be included adjacent the threaded portion 20 of the female member 12.

Figure 6:
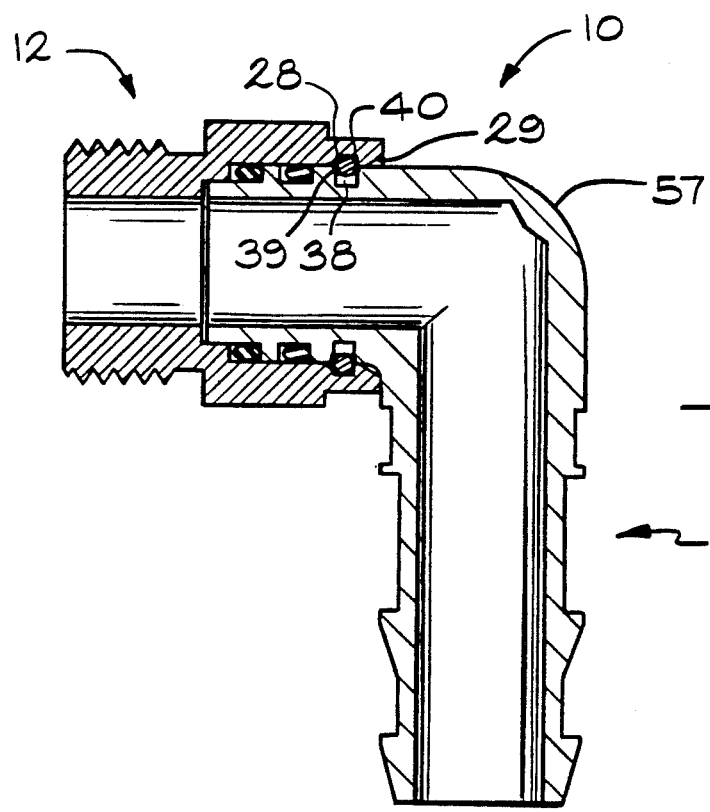
FIG. 6 is a cross-sectional view of the first embodiment of the present invention showing the male pipe member having a 90° elbow.

Referring to FIG. 6, the first embodiment assembly 10 may include a male member 14 having a 90° elbow 57. The angle may vary depending on the application.

Figure 7:
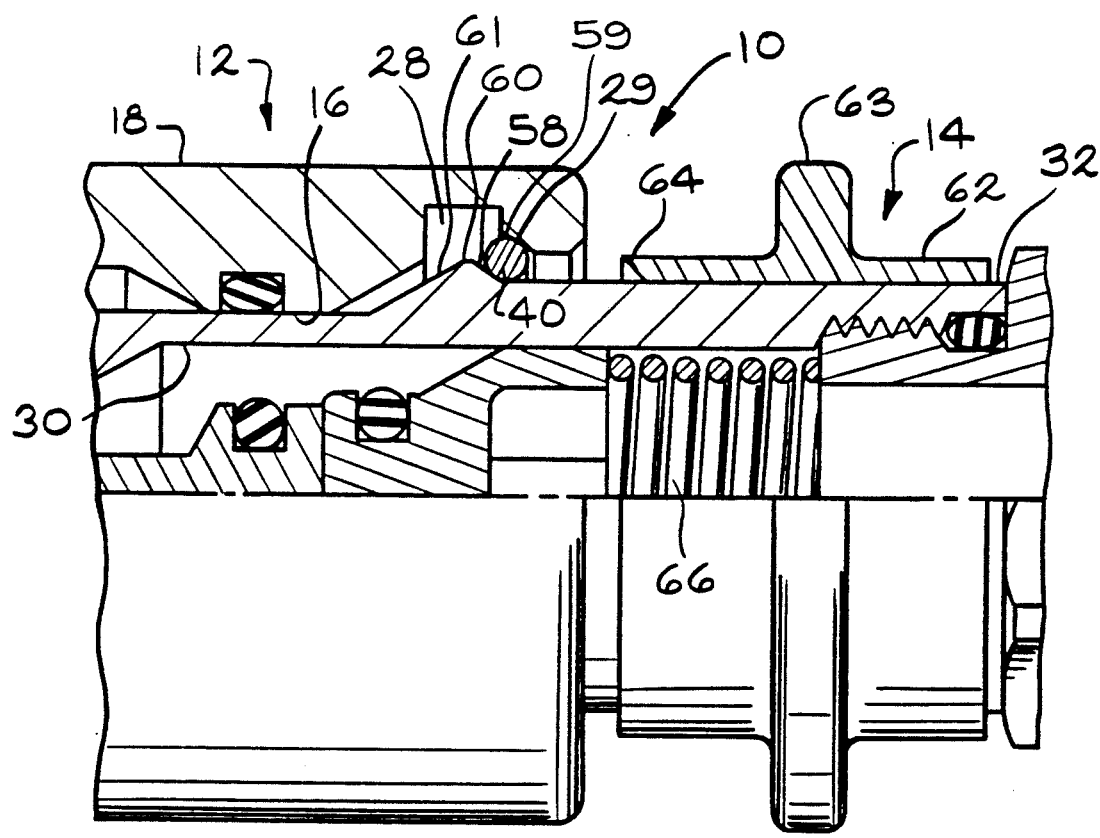
FIG. 7 is a side elevational view of a second embodiment of the present invention with sections partially cut-away showing the male pipe member fully inserted in the female pipe member and the position of the locking ring.
Figure 8:
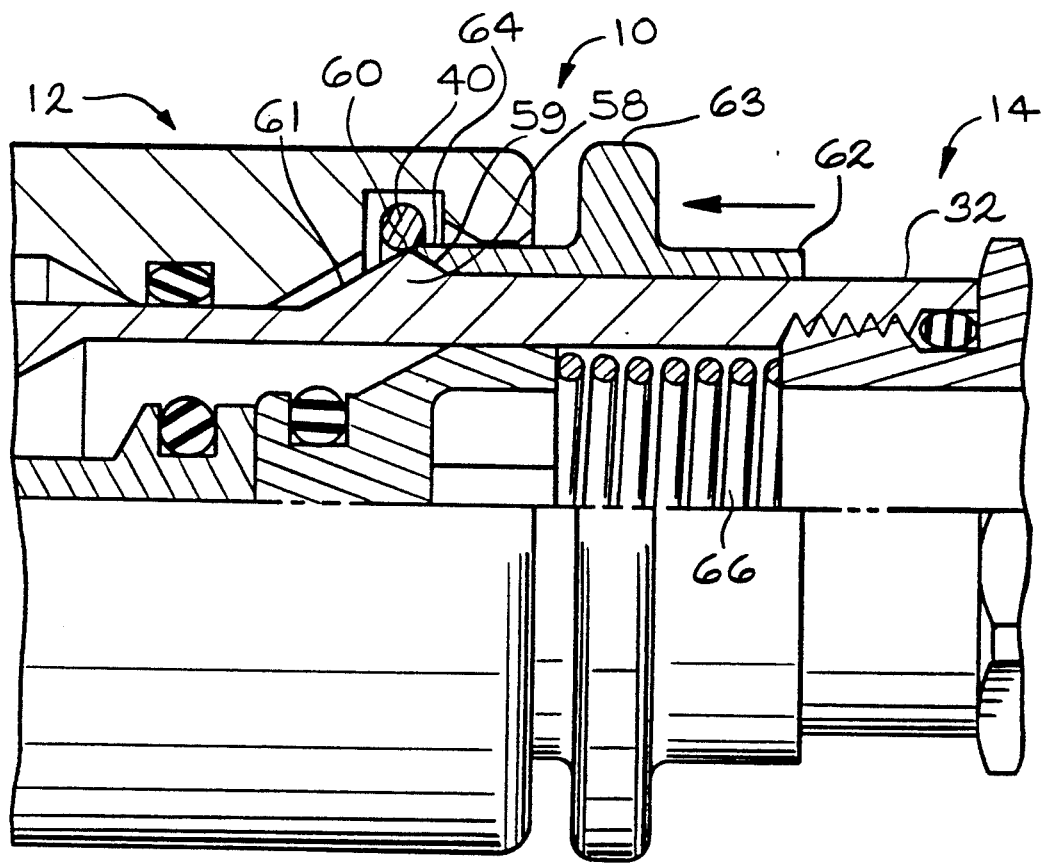
FIG. 8 is a view similar to FIG. 7 showing the release sleeve engaging the locking ring to detach the male pipe member from the female pipe member.
Figure 9:
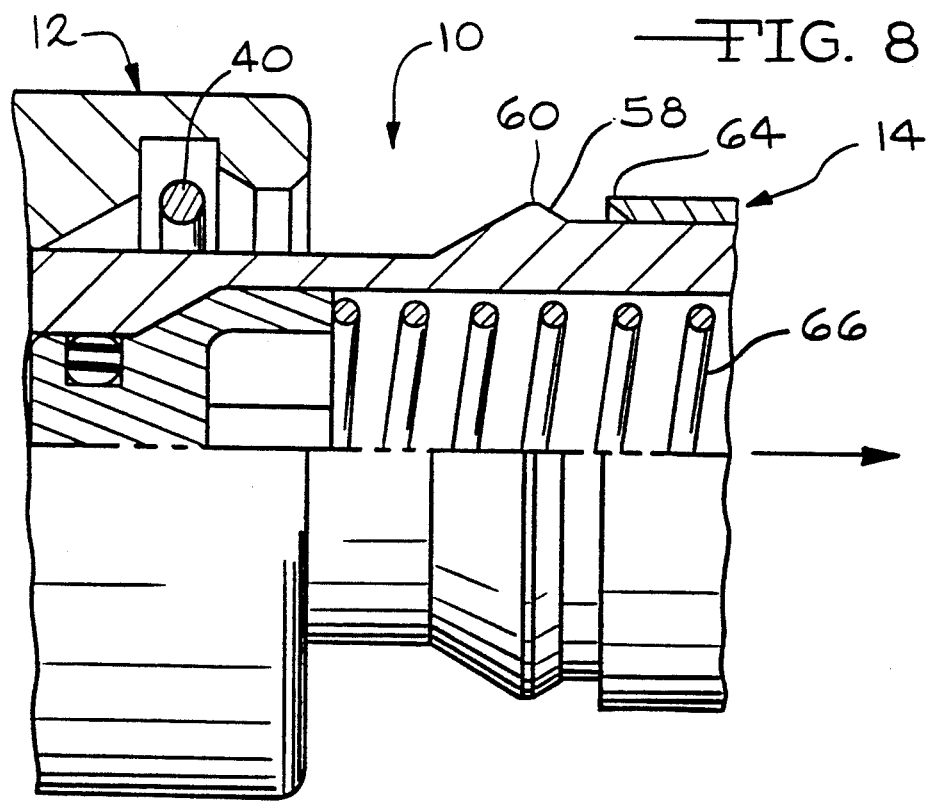
FIG. 9 is a view similar to FIG. 7 showing the male pipe member being separated by the female pipe member and the position of the locking ring.

A second embodiment of the present invention is shown in FIGS. 7 through 9. The coupling assembly 10 includes a female pipe member 12 and a male pipe member 14. The female member 12 has a diameter larger than the diameter of the male member 14 for receiving the male member. The female member 12 includes an inner surface 16 and an outer surface 18. The inner surface 16 includes a locking ring receiving cavity 28. The inner surface further includes a chamfer 29 adjacent to the cavity 28.

The male member 14 includes an interior surface 30 and an exterior surface 32. A ridge 58 is positioned on the exterior surface 32. The ridge 58 includes a shoulder 59, an apex 60 and a ramp 61. A release sleeve 62 is movably mounted on the exterior surface 32 of the male member. The sleeve 62 includes a grip portion 63 and an edge 64. A resilient spring 66 is positioned adjacent to the interior surface 30 of the male member 14.

A locking ring 40, as described above, maintains the connection of the male and female members. When the male member 14 is inserted in the female member 14, the locking ring 40, which has been placed in the cavity 28, is forced up the ramp 61, over the apex 60 and against the shoulder 59 of the ridge 58. As the locking ring 40 is forced over the apex 60 it expands. The ring 40 then contracts after crossing over the apex 60. The ring 40 holds the members together. The locking ring 40 also acts as a bearing as described above.

In the second embodiment assembly, as shown in FIGS. 7 through 9, the locking ring 40 can be released to disconnect the two members. Referring to FIGS. 8 and 9, the release sleeve 62 can be moved by engaging the grip portion 63 so that the edge 64 contacts the ring 40. The force applied on the release sleeve 62 causes the ring 40 to travel over the apex 60 of the ridge 58 thereby allowing the male member 14 to be separated from the female member 12. The male member 14 may then be reconnected to the female member 12 as described above.

Figure 10:
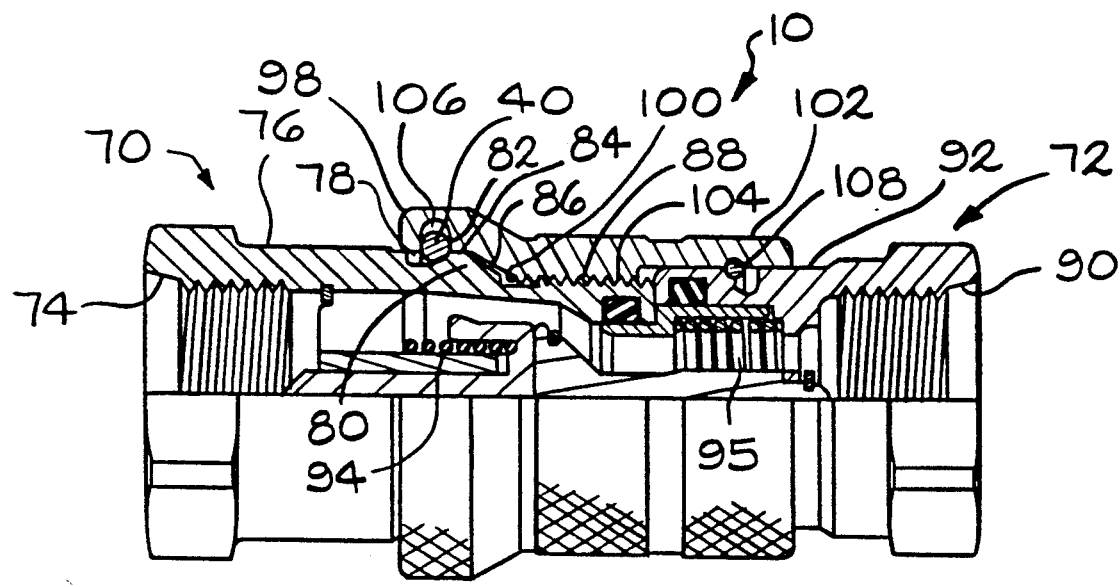
FIG. 10 is a side elevational view of a third embodiment of the present invention with sections partially cut-away showing the male pipe member fully inserted in the female pipe member and the position of the locking ring.
Figure 11:
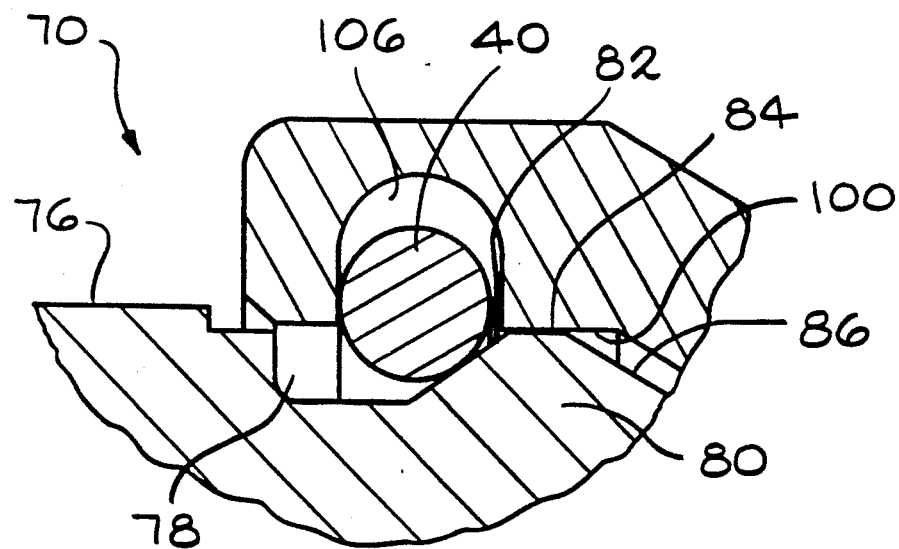
FIG. 11 is an enlarged view of a portion of the third embodiment showing the position of the locking ring; and, FIG. 12 is a view similar to FIG. 10 showing the male pipe member separated from the female pipe member and the position of the locking ring.
Figure 12:
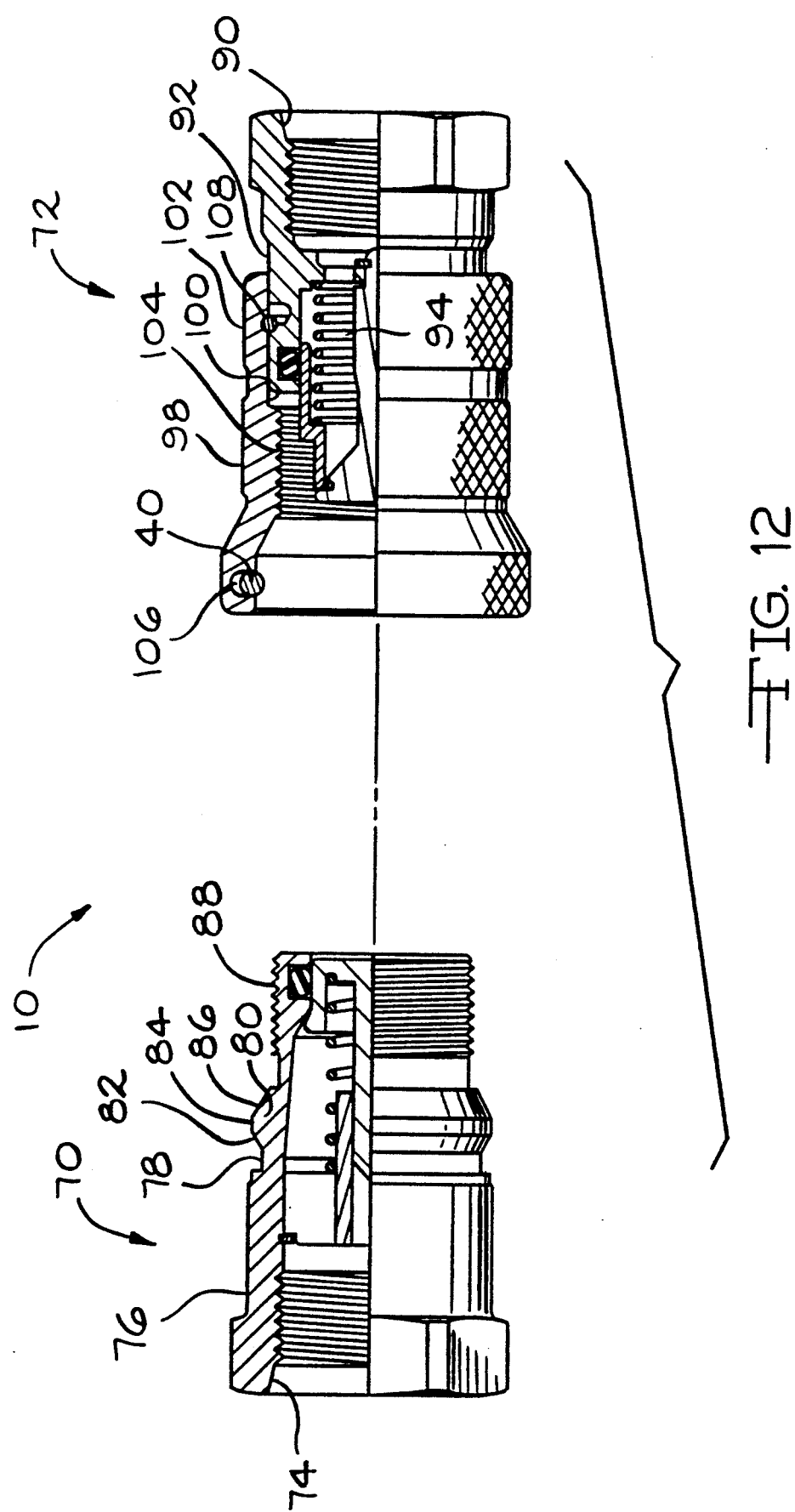

A third embodiment of the present invention is shown in FIGS. 10 through 12. The coupling assembly 10 includes a first pipe member 70 and a second pipe member 72 in which both members have substantially similar diameters. The first member 70 includes an interior surface 74 and an exterior surface 76. The exterior surface includes an annular groove 78. The exterior surface 76 also includes a ridge portion 80 adjacent to the groove 78. The ridge 80 includes a shoulder 82, an apex 84 and a ramp 86. The exterior surface 76 further includes a threaded portion 88.

The second member 72 includes an inner surface 90 and an outer surface 92. Resilient springs 94 and 95 are positioned adjacent the interior surface 74 of the first member 70 and the inner surface 90 of the second member 72, respectively, to bias the first and second members when they are connected.

A securing sleeve 98 is movably mounted on the outer surface 92 of the second member 72. The securing sleeve includes an interior surface 100 and an exterior surface 102. The interior surface 100 includes threads 104 that are adapted to receive the threaded portion 88 of the first member 72. The interior surface 100 further includes an annular locking ring receiving cavity 106. The sleeve 98 is connected to the second member 72 by an annular bearing 108 positioned between the interior surface 100 of the sleeve and the outer surface 92 of the second member.

A locking ring 40, as described above, is positioned in the cavity 106 prior to the connection of the first member 70 and the second member 72. The members are connected together when the threaded portion 88 of the first member 70 is screwed into the threads 104 of the sleeve 98. As the first member 70 and the sleeve 98 are being screwed together, the locking ring 40 travels up the ramp 86, over the apex 84, down the shoulder 82 and into the groove 78. As the ring 40 travels up the ramp 86, it expands. When it travels down the shoulder 82 it contracts. The ring 40 is positioned partly in the groove 78 and partly in the cavity 106. The ring 40 when positioned in this manner acts to securely hold the first and second members together. The two members can be separated by unscrewing the securing sleeve 98 from the first member 70. This causes the ring 40 to be forced over the apex 84 of the ridge 80 thereby releasing the sleeve 98 from the first member 70.

It should be understood that many changes can be made to the invention as described above and still fall within the scope of the following claims.

We claim:

1. A coupling assembly for connecting two members, comprising, in combination:

an annular locking means;

a first member having an exterior surface, said exterior surface having a groove for receiving said locking means, said groove having a groove chamfer, said groove chamfer being positioned adjacent said exterior surface of said first member;

a second member having a portion for receiving said first member, said second member having an inner surface, said inner surface have a cavity for receiving said locking means;

whereby said first member and said second member are secured together when said first member is received by said second member and said locking means is engaged in said groove and said cavity, said locking means being maintained in position by said cavity, said groove and said groove chamfer.

2. The coupling assembly of claim 1, wherein said annular locking means is a ring having two spaced apart ends.

3. The coupling assembly of claim 2, wherein said ring is spring tempered material.

4. The coupling assembly of claim 1, wherein said first member is a pipe having a tubular shape.

5. The coupling assembly of claim 1, wherein said second member is a pipe having a tubular shape.

6. The coupling assembly of claim 1, wherein said second member includes a chamfer adjacent to said cavity.

7. A coupling assembly for connecting two members, comprising, in combination:
   an annular locking means;
   a first member having an exterior surface, said exterior surface having a ridge consisting of a ramp, an apex and a shoulder;
   a second member having a portion for receiving said first member, said second member having an inner surface, said inner surface having a cavity for receiving said locking means, said inner surface further including a chamfer adjacent to said cavity;
   a release sleeve movably mounted on said exterior surface of said first member, said sleeve having an edge;
   whereby when said first member is inserted in said second member, said locking means travels up said ramp, over said apex and against said shoulder to engage said ridge, said cavity and said chamfer on said inner surface to secure said first member to said second member, said members are released when said edge of said release sleeve forces said locking means over said apex of said ridge.

8. The coupling assembly of claim 7, wherein said annular locking means is a ring having two spaced apart ends.

9. The coupling assembly of claim 8, wherein said ring is spring tempered material.

10. The coupling assembly of claim 7, wherein said first member is a pipe having a tubular shape.

11. The coupling assembly of claim 7, wherein said second member is a pipe having a tubular shape.

12. A coupling assembly for connecting two members, comprising, in combination:
    an annular locking means;
    a first member having an exterior surface, said exterior surface having a ridge consisting of a ramp, an apex and a shoulder adjacent to a groove for receiving said locking means, said exterior surface including a threaded portion;
    a second member having an outer surface;
    a securing sleeve on said outer surface of said second member and means movably mounting said securing sleeve on said outer surface of said second member, said sleeve having an interior surface, said interior surface having a cavity for receiving said locking means, said interior surface having a threaded portion for receiving said threaded portion on said exterior surface of said first member;
    whereby said first member and said second member are secured together by connecting said first member to said securing sleeve by said threaded portions and said locking means travels up said ramp, over said apex and against said shoulder to engage said groove and said cavity, said threaded portions acting as a primary connection and said locking means acting as a secondary connection, said locking means acting to prevent disconnection of said first and second members, whereby said first member and said second member can be disconnected by unthreading said threaded portions, thereby causing said locking means to travel over said apex and disconnecting said members.

13. The coupling assembly of claim 12, wherein said annular locking means is a ring having two spaced apart ends.

14. The coupling assembly of claim 13, wherein said ring is spring tempered material.

15. The coupling assembly of claim 12, wherein said first member is a pipe having a tubular shape.

16. The coupling assembly of claim 12, wherein said second member is a pipe having a tubular shape.

* * * * *